United States Patent [19]
Fanjoy

[11] Patent Number: 5,842,181
[45] Date of Patent: Nov. 24, 1998

[54] REMOTE HAND-HELD TIME TRACKING DEVICE AND METHOD THEREFOR

[76] Inventor: Logan M. Fanjoy, 595 W. LaDonna, Tempe, Ariz. 85282

[21] Appl. No.: 549,478

[22] Filed: Oct. 27, 1995

[51] Int. Cl.[6] .................................................. G06F 19/00
[52] U.S. Cl. ............................................................ 705/32
[58] Field of Search ................... 395/232, 207, 395/211; 364/705.06, 705.07, 468.18; 705/32, 11

[56] References Cited

U.S. PATENT DOCUMENTS

| | | | |
|---|---|---|---|
| 4,164,038 | 8/1979 | Nachtigal | 395/232 |
| 4,961,158 | 10/1990 | Sussman | 364/709.04 |
| 5,068,787 | 11/1991 | Pipella et al. | 364/406 |
| 5,212,635 | 5/1993 | Ferriter | 364/402 |
| 5,239,460 | 8/1993 | LaRoche | 364/401 |
| 5,267,147 | 11/1993 | Harshaw et al. | 364/401 |
| 5,379,213 | 1/1995 | Derks | 364/411 |
| 5,493,492 | 2/1996 | Cramer et al. | 395/232 |
| 5,508,977 | 4/1996 | Tymn | 395/232 |

*Primary Examiner*—Donald E. McElheny, Jr.
*Attorney, Agent, or Firm*—Meschkow & Gresham, P.L.C.; Lowell W. Gresham; Jordan M. Meschkow

[57] ABSTRACT

A remote hand-held data collection device associates time with charge accounts at the instant when and the place where work is performed. The device obtains a set of descriptive codes that describe a work assignment and accrues time during which the work assignment is performed. A new work assignment may be quickly described by updating only those descriptive codes that differ from the previously entered set. The device is capable of checking the validity of the descriptive codes by comparing them to a number of valid input codes stored in a memory. The work-related records are stored in a database that is eventually uploaded to a central compiling computer for formatting and processing. An edit feature allows the user to modify erroneous data in the database, and a comment feature allows the user to enter alphanumeric messages into the database.

24 Claims, 4 Drawing Sheets

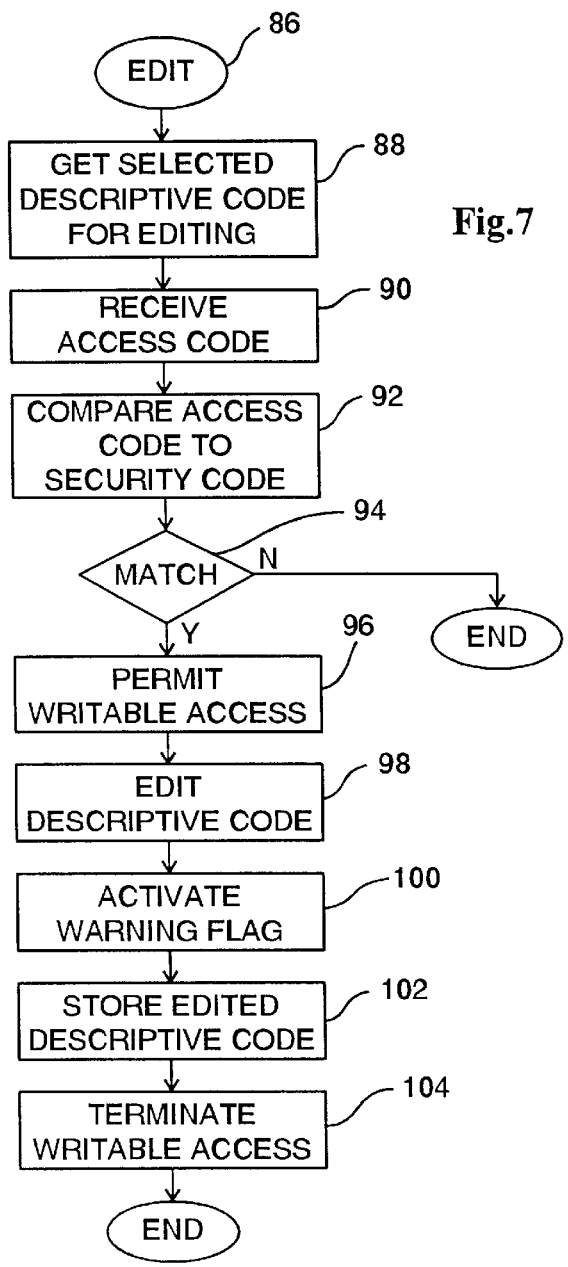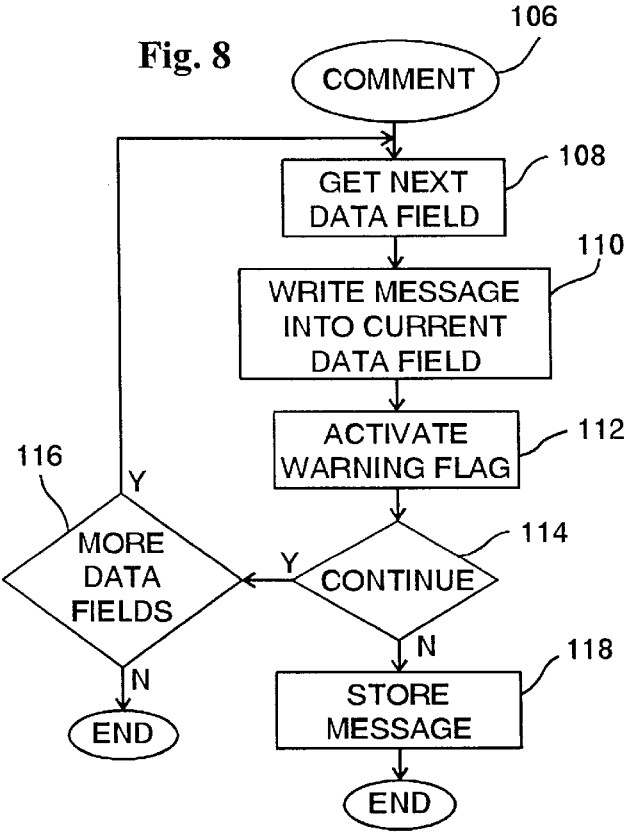
Fig. 7
Fig. 8

REMOTE HAND-HELD TIME TRACKING DEVICE AND METHOD THEREFOR

FIELD OF THE INVENTION

The present invention relates generally to time tracking devices. In particular, the present invention relates to a portable device that associates time with charge accounts at the place where and the time when work is performed.

BACKGROUND OF THE INVENTION

Most working people must account for the amount of time that they devote to specific work assignments. Time tracking data may be utilized for billing purposes, job performance evaluations, inventory assessments, or work-related statistical analyses. When an individual is involved with a variety of projects, he or she must carefully identify the particular work assignments and the amount of time chargeable to each work assignment. Unfortunately, the amount of time charged to each project or the identification of specific job tasks are easily forgotten before being recorded or are easily recorded erroneously using conventional systems.

Several computerized, mechanical, and paper systems have been developed to record the amount of time an individual spends performing a specific job or function. At least one time tracking system utilizes portable data collection devices in conjunction with a central compiling computer. The devices may collect descriptive data (e.g., department identification codes, client numbers, part numbers, or the like) that are subsequently uploaded to the central computer. Unfortunately, the quality and reliability of the collected data may be unsatisfactory for practical purposes, and the personal devices may be difficult or overly time consuming to operate. Inaccurate or unreliable data may require extensive post-collection analysis, verification, and/or correction, which effectively defeats the advantages of having a remote-based electronic time tracking system. If the personal devices are user unfriendly or require lengthy input procedures, then they tend not to be used consistently and continuously. As such, the usefulness of these systems may be limited.

A few conventional time tracking systems merely add time stamps to any user input, whether or not the input adequately describes the particular work assignment. One conventional portable unit accepts whatever data the user inputs, without testing the validity or accuracy of the data. In addition, a user may have no immediate warning that he or she has entered invalid data. If invalid data is entered, such systems require substantial time and effort to analyze and correct the invalid data after it has been collected and uploaded to the central computer.

The integrity and quality of work-related data is important for purposes of accurate billing and accounting. Higher data integrity results when a system restricts the manipulation of previously entered data or indicates when alterations have occurred. For example, a worker may feel uncomfortable charging the actual amount of time he or she spent on a certain task and wish to alter the data to reflect the amount of time believed to be appropriate for the given task. Data integrity suffers when such alterations are left unchecked.

To preserve workday records and to guard against manipulation of previously entered data, it may be advantageous to prevent access to previously entered data. Unfortunately, a "secured" system may not facilitate the legitimate correction of erroneous or inadvertently entered data. In such a system, honest mistakes could not be corrected, and the integrity of the data would be corrupted. On the other hand, if information is stored in a device with unlimited data access, then manipulated records may be undetected at the system level. For example, nothing would prevent the illegitimate alteration of the time accrual data, and the system would rely upon any data as if it were 100% reliable.

Conventional devices that collect data associated with time periods and work assignments are undesirably complicated to operate. For example, some time tracking systems are designed for use with portable personal computers. Thus, a user must be able to interact with a computer operating system, initiate a time tracking program, and interact with the program itself. In addition, the worker must have access to a computer throughout the workday while working on various work assignments. If participating in a work assignment that does not require a computer, the worker will be burdened with the additional task of carrying or monitoring the computer while he or she performs the work assignment.

Even non-computer-based systems may require the user to follow strict operating protocols during data collection, manipulation, and/or analysis. Many workers would rather not be interrupted by complex "accounting" details while they are busy at more important tasks. If work assignments are not immediately entered while the details are fresh in the worker's memory, then data inaccuracies are likely to occur.

A typical work assignment may be uniquely defined by several descriptors (e.g., user name, job description, part number, or client number). One known system requires the user to input work descriptors in a specific order according to its inflexible operating methodology. In addition, each work descriptor must be reentered when a new work assignment begins, whether or not one or more descriptors remain unchanged.

Such a system is inconvenient to use due to the strict operating procedures that must be followed. For example, a worker may decide to postpone a time consuming data entry routine until he or she takes a break. The postponement of data entry may lead to inaccuracies when the worker finally attempt to recollect the pertinent information. In addition, workers must recall the specific operating routine each time a new work assignment is performed. If such operating routines are too complex or confusing, users tend to fail to consistently record important work-related data during the workday.

Some portable time tracking devices are capable of storing work-related data over a limited scope of time. For example, at least one known data collection unit requires the collected data to be uploaded to a central computer on a daily basis. Such limited time scope is undesirable when a work assignment extends beyond the daily "cutoff" point or when the portable device is to be used at a remote site where frequent uploading is impossible. In addition, work-related data for an entire day may be unintentionally lost if the user forgets to upload the data at the end of his or her work shift.

SUMMARY OF THE INVENTION

Accordingly, it is an advantage of the present invention that an improved data collection device for associating time with work assignments is provided.

Another advantage of the present invention is that the data collection device is capable of validating the input data at the time of entry.

An additional advantage of the present invention is that the data collection device is easy to operate.

Another advantage is that the present invention does not restrict the manner in which data may be entered into the data collection device.

Another advantage is that the data collection device may be utilized to record data over extended periods of time.

The above and other advantages of the present invention are carried out in one form by a remote hand-held data collection device for associating time with charge accounts at the instant when work is performed. The data collection device includes a user interface for obtaining a plurality of descriptive codes that describe a work assignment, a memory that stores one or more valid input codes, a processor, and a date/time monitor for accruing time associated with the work assignment. The processor compares one of the descriptive codes to the valid input codes, and time begins accruing when the descriptive code matches one of the valid input codes.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 7 is an edit process performed by the data collection device; and

FIG. 8 is a comment process performed by the data collection device.

DETAILED DESCRIPTION OF THE PREFERRED EMBODIMENT

Figure 1:
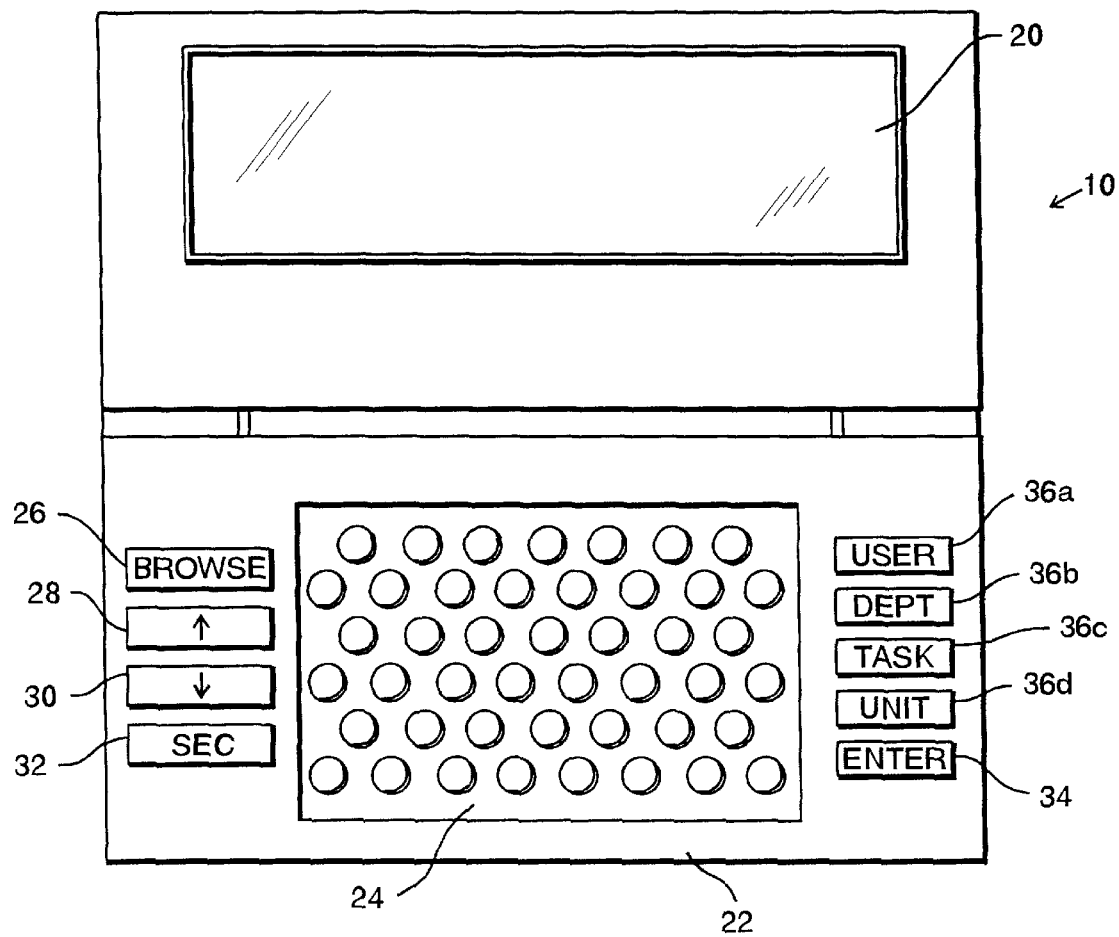
FIG. 1 is a top view of an exemplary data collection device that associates time with charge accounts.
Figure 2:
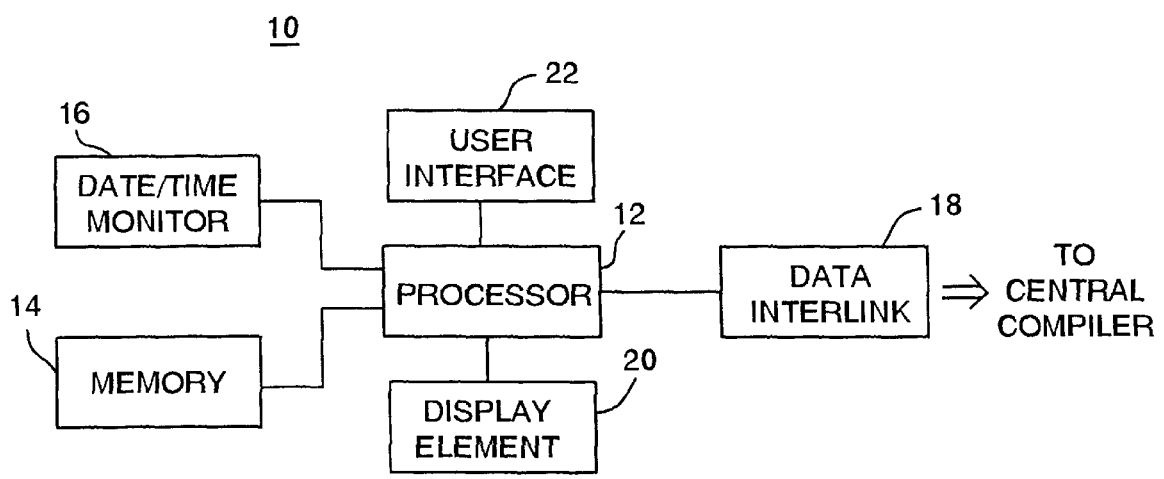
FIG. 2 is a block diagram representation of the data collection device.

With reference to FIG. 1, a top view of an exemplary data collection device 10 according to the present invention is illustrated. FIG. 2 is a block diagram depiction of data collection device 10. Preferably, device 10 is a self-powered unit that is relatively small in size (comparable to a hand-held calculator). The size of device 10 facilitates ease of use and allows it to be conveniently carried from one work site to another. For example, device 10 may be easily carried in a user's pocket such that it is readily available throughout the day and during diverse activities. For clarity, standard operating components well known to those skilled in the art are not shown in FIGS. 1–2 or described in detail herein.

Device 10 receives user inputs to associate time with charge accounts at the instant when and the place where work is performed. Briefly, device 10 groups user-entered descriptive codes into records that describe or identify work assignments that are performed during various time periods. The records include the amount of time that is spent performing each work assignment. The records are eventually uploaded to a central compiler (not shown), where the data contained in the records are analyzed and processed. Device 10 is capable of remote operation away from the central compiler. The records may provide information utilized in employee performance evaluations, billing statements, inventory assessments, or statistical reports associated with the accumulated data.

Generally, device 10 includes a processor 12 (see FIG. 2) that controls the operation of device 10. Several components of device 10 are connected to or are in data communication with processor 12, including a memory 14, a date/time monitor 16, a data interlink 18, a display element 20, and a user interface 22. One or more of processor 12, memory 14, date/time monitor 16, and data interlink 18 may be realized as a common integrated circuit. Processor 12 may, for example, be a conventional microprocessor circuit well known in this art. According to one aspect of the preferred embodiment, processor 12 functions as a comparator to compare the descriptive codes to one or more valid input codes. Processor 12 is also configured to carry out various operating processes described herein.

Memory 14 stores user-entered data, such as the descriptive codes, in addition to software programs that define the various processes described herein. Memory 14 is configured to include a database that contains the individual records associated with the accumulated data. Memory 14 also stores security codes and valid input codes that are utilized by device 10. The security codes and valid input codes are described in detail below. Memory 14 may include buffers for temporarily storing data when necessary. Memory 14 is selected to have an adequate amount of storage space such that the work records need not be frequently uploaded to the central compiler. Consequently, device 10 is preferably capable of storing data collected for up to several days at a time.

Device 10 employs date/time monitor 16 to provide date stamps and time accrual data for inclusion into the records associated with the various work assignments. Device 10 may utilize conventional clocking or timing circuits for date/time monitor 16. Date stamps are desirable to enable device 10 to accumulate work-related data for more than 24 hours at a time before having to upload the data to the central compiler.

Date/time monitor 16 preferably accrues time during which each work assignment is performed. As such, precise "start" and "end" time stamps are not required in the preferred embodiment. However device 10 may perform time accrual by recording a start time and calculating the elapsed time after recording an end time. Absolute time may be associated with the various time durations when the data is uploaded to the central compiler. Thus, any number of devices 10 may be synchronized with the central compiler during uploading. Because device 10 preferably records time intervals rather than precise time stamps, complications concerning independent clock synchronization are reduced.

To ensure that time is accounted for during the course of each working day, date/time monitor 16 continuously runs whether or not a work-related assignment is being performed. This enables device 10 to provide the central compiler with a total amount of time in conjunction with the records that describe the various work assignments, downtime, and/or diversions that occurred during that time.

Device 10 preferably includes data interlink 18, which enables the uploading of data from device 10 to the central compiler and the occasional downloading of data to device 10 from the central compiler or other data sources. In addition, data interlink 18 may facilitate the downloading of various operating programs and/or valid input codes. Data interlink 18 may incorporate any suitable data transmission technology, including infrared, RF, or direct wire connections. In addition, nothing prevents device 10 from utilizing data storage disks, tapes, or the like, which may be physically transferred between device 10 and the central compiler.

Display element 20 provides visual feedback to the user of device 10. Display elements are well known in the art, and will not be described in detail herein. Display element 20 may be a liquid crystal display, a video screen display, or any other suitable configuration. Display element 20 is configured to display as many alphanumeric characters as necessary for the specific application. According to one exemplary embodiment, display element 20 is capable of displaying at least 32 characters at one time.

User interface 22 is preferably configured to allow the user to operate device 10 easily and efficiently. FIG. 1 merely depicts an exemplary user interface 22, and device 10 may employ any number of different physical layouts and configurations for user interface 22. User interface 22 includes an alphanumeric keypad 24 for obtaining the descriptive codes that describe the user's work assignments. Of course, user interface 22 may be employed to input any other data utilized by device 10. Such data may include security access codes, programming instructions, and the like. User interface 22 may include a number of function-specific buttons, including a BROWSE button 26, a SCROLL UP button 28, a SCROLL DOWN button 30, a SEC (security) button 32, and an ENTER button 34. The various buttons are described in detail below where appropriate.

User interface 22 preferably includes a number of data field buttons 36. Data field buttons 36 are utilized to prompt device 10 when a new work assignment begins, to edit an existing record, or to enter a comment message. Data field buttons 36 are preferably associated with a like number of descriptive data fields, and may include a USER field button 36a, a DEPT field button 36b, a TASK field button 36c, and a UNIT field button 36d. Preferably, the user engages one of data field buttons 36 and enters (via alphanumeric keypad 24) the appropriate descriptive code associated with that data field.

For example, after engaging USER field button 36a, the user may be prompted to enter his or her name, employee number, or social security number. DEPT field button 36b may be associated with a data field that describes the user's work department, group name, supervisor, or the like. TASK field button 36c may be associated with a data field that describes the current task, job assignment, or project that the user is performing. For example, the user may be required to input ASSEMBLY, TEST, QA, BREAK TIME, WAIT, OFFWORK, or some other alphanumeric code to describe the current task. UNIT field button 36d may be engaged when the user needs to describe what the work is being performed on, such as a specific part or document. It should be understood that data field buttons 36 are depicted and labeled in FIG. 1 for convenience. Nothing prevents the present invention from utilizing more or less buttons to achieve equivalent results.

Figure 3:
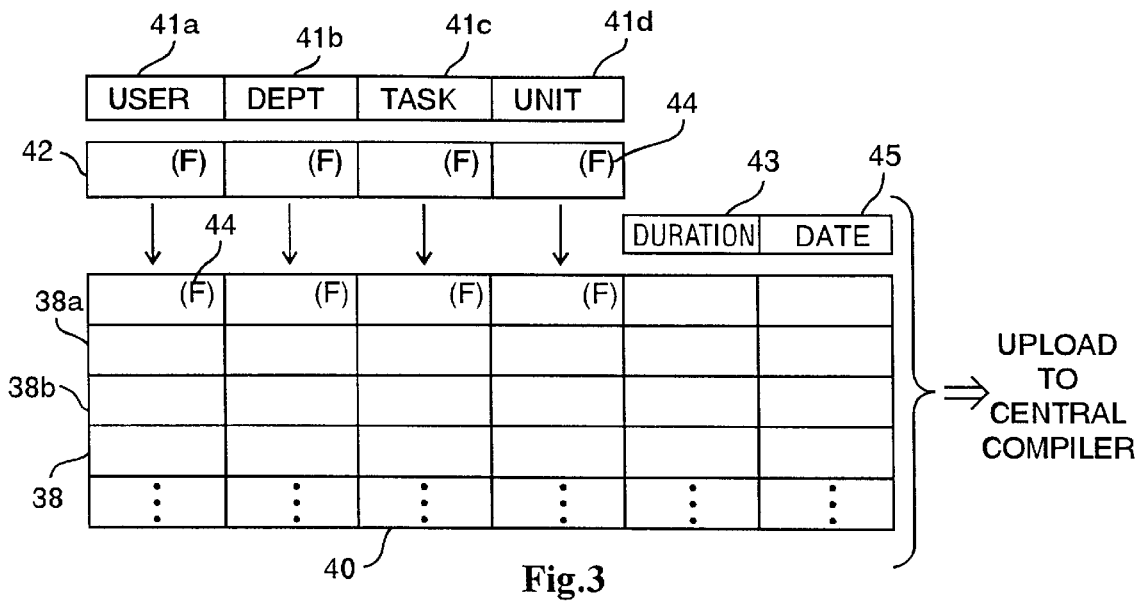
FIG. 3 is a schematic representation of an exemplary data arrangement utilized by the data collection device.

With reference to FIG. 3, a schematic representation of an exemplary data arrangement utilized by device 10 is illustrated. The descriptive codes and other work-related data may be arranged in the form of records 38 that are stored in memory 14 (see FIG. 2) as part of a database 40. In the preferred embodiment, a default buffer 42 temporarily stores the last-entered descriptive codes until the user engages ENTER button 34 (see FIG. 1). When ENTER button 34 is engaged, the descriptive codes are copied from default buffer 42 into a new record 38a and the last record 38b is completed. Last record 38b is completed by adding the time accrued during the last work assignment (identified as DURATION 43 in FIG. 3) and the current date, or a date stamp 45, to last record 38b. The current descriptive codes remain in default buffer 38 until one or more is updated again.

The descriptive codes are preferably stored in a like number of data fields 41a–d. Of course, the number of data fields 41 will vary depending upon the number of descriptive codes utilized to describe the various work assignments. In the preferred embodiment, each data field 41 is capable of storing up to 32 characters. Thus, each descriptive code may be up to 32 characters in length.

Each descriptive code preferably has a warning flag associated with it. For example, as shown in FIG. 3, each data field 41 may include a warning flag bit 44 for each descriptive code. Device 10 selectively activates one or more of the warning flag bits 44 in response to different user inputs. For example, an associated warning flag bit 44 may be activated if an invalid descriptive code is entered or if the user edits a descriptive code stored in an existing record. Warning flags are described below along with several processing tasks.

According to the preferred embodiment, records 38 accumulate in memory 14 until database 40 is uploaded to the central compiler. Those skilled in the art will appreciate that records 38 may be formatted in any suitable manner for compatibility with the central compiler or any other computing device. As described above, the central compiler may process records 38 according to conventional time accounting or other statistical manipulation techniques.

Figure 4:
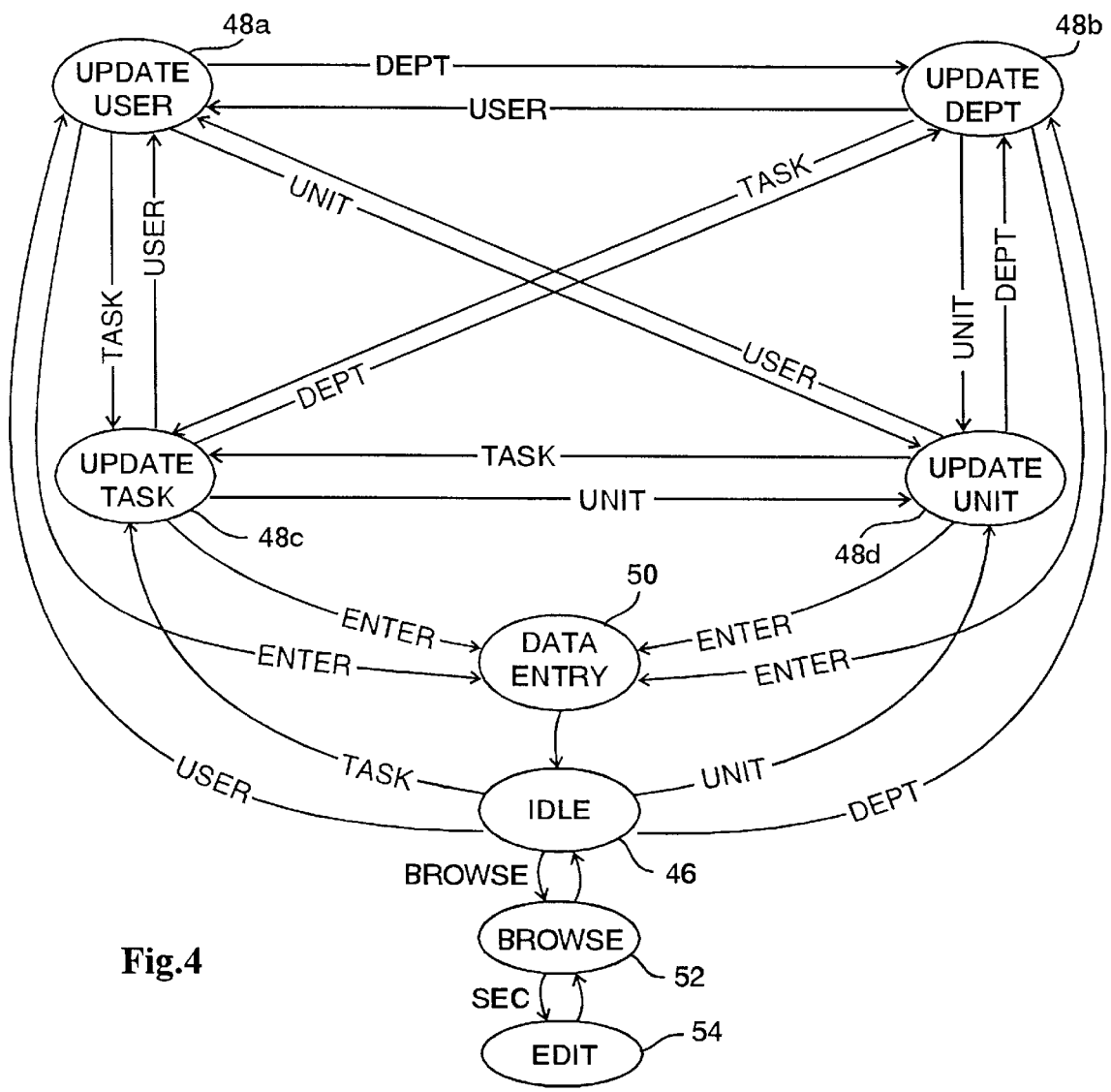
FIG. 4 is a state diagram depicting various operational states of the data collection device.

FIG. 4 is a state diagram representing a preferred data entry methodology employed by device 10. FIG. 4 depicts various operational states of device 10, and the interconnecting lines represent transitions between states. Where appropriate, the buttons utilized to prompt various state transitions are denoted.

Device 10 normally operates in an idle state 46 during which time accrues for a current set of descriptive codes. However, time continues to accrue while device 10 operates in other states. When one of data field buttons 36a–d are engaged, device 10 may transition to a respective update state 48a–d. For example, if the user wishes to change the current task description, then he or she engages TASK field button 36c to place device 10 into update task state 48c. While device 10 is in one of update states 48a–d, the user may enter a new descriptive code to describe the new work assignment.

Device 10 is preferably capable of switching between each of update states 48a–d without having to reenter idle state 44. Rather than require reentry of each descriptive code, device 10 allows the user to reenter only those descriptive codes that have changed. Furthermore, device 10 may be configured to allow the initial and updated descriptive codes to be entered in any order. Thus, the user can quickly and easily update his or her current work assignment. Consequently, the user need not remember complex operating methodologies for entering and updating work-identifying data.

As described above in connection with FIG. 3, the updated descriptive codes may be stored in default buffer 42 until the user engages ENTER button 34 (see FIG. 1). Device 10 enters a data entry state 50 upon activation of ENTER button 34. A change in one or more of the descriptive codes signifies that a new work assignment has begun. While in data entry state 50, device 10 stops accruing time for the previous work assignment and begins accruing time for the new work assignment.

From idle state 46, device 10 may transition to a browse state 52 in response to engagement of BROWSE button 26. When device 10 is in browse state 52, the user may view portions of database 40. Preferably, the user may scroll through previously entered descriptive codes by engaging SCROLL UP and SCROLL DOWN buttons 28 and 30. If the user desires to edit one of the descriptive codes, he or she may engage SEC button 32 to transition device 10 from browse state 52 to an edit state 54. Entry of SEC button 32 may prompt the user to enter an access code or password. If the access code is correct, edit state 54 enables the user to alter a descriptive code as desired. The editing feature of device 10 is described in detail below.

Figure 5:
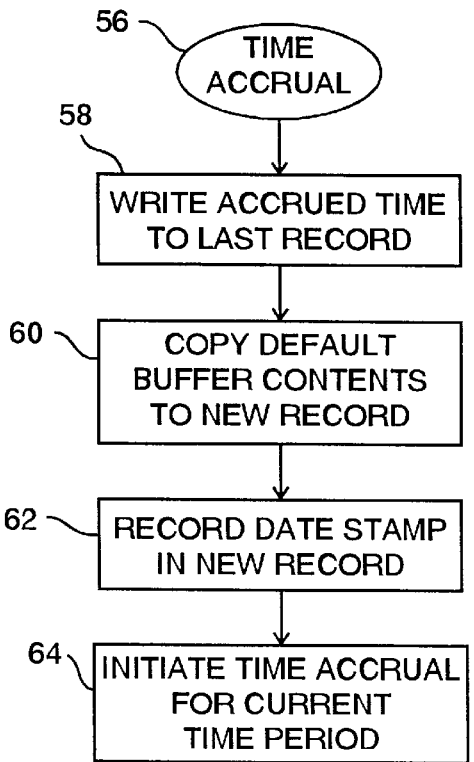
FIG. 5 is a flow diagram of a time accrual process performed by the data collection device.

Referring to FIG. 5, a time accrual process 56 is depicted as a flow diagram. Process 56 is performed by device 10 to accrue time during which a current work assignment is performed. Process 56 may be performed during data entry state 50 (see FIG. 4), after device 10 obtains a set of descriptive codes. For purposes of process 56, all descriptive codes are assumed to be valid, i.e., no erroneous codes are entered. Input validation is described in detail below.

As described above, device 10 completes last record 38b and begins new record 38a when the user enters a new set of descriptive codes. As such, time accrual process 56 begins with a task 58, which writes the time accrued during the last work assignment to last record 38b (see FIG. 3). Upon completion of task 58, last record 38b preferably contains a set of descriptive codes, the date when the last work assignment was performed, and the amount of time accrued during the last work assignment.

Following task 58, a task 60 begins new record 38a by copying the contents of default buffer 42 to new record 38a. As described above, default buffer 42 may temporarily store updated descriptive codes at least until the user engages, for example, ENTER button 34 (see FIG. 1). After task 60, a task 62 records a date stamp 45 in new record 38a. Although the preferred embodiment records date stamp 45 to indicate the beginning of the new work assignment, nothing prevents device 10 from recording date stamp 45 to indicate the end of the last work assignment.

After task 62 records date stamp 45, a task 64 is performed. Task 64 initiates accrual of time for the current time period. The current work assignment is performed during the current time period, which may be of indeterminate length. Time continues to accrue for the current time period until the descriptive codes are updated. Following task 64, time accrual process 56 ends and device 10 preferably enters idle state 46. It should be appreciated that process 56 may be performed to generate any number of records 38 associated with a like number of work assignments. As described above, records 38 may be stored in memory 14 until database 40 is uploaded to the central compiler for further processing. According to the preferred embodiment, device 10 need not upload the records on a daily basis, which allows device 10 to accumulate work-related data over extended periods of time.

Figure 6:
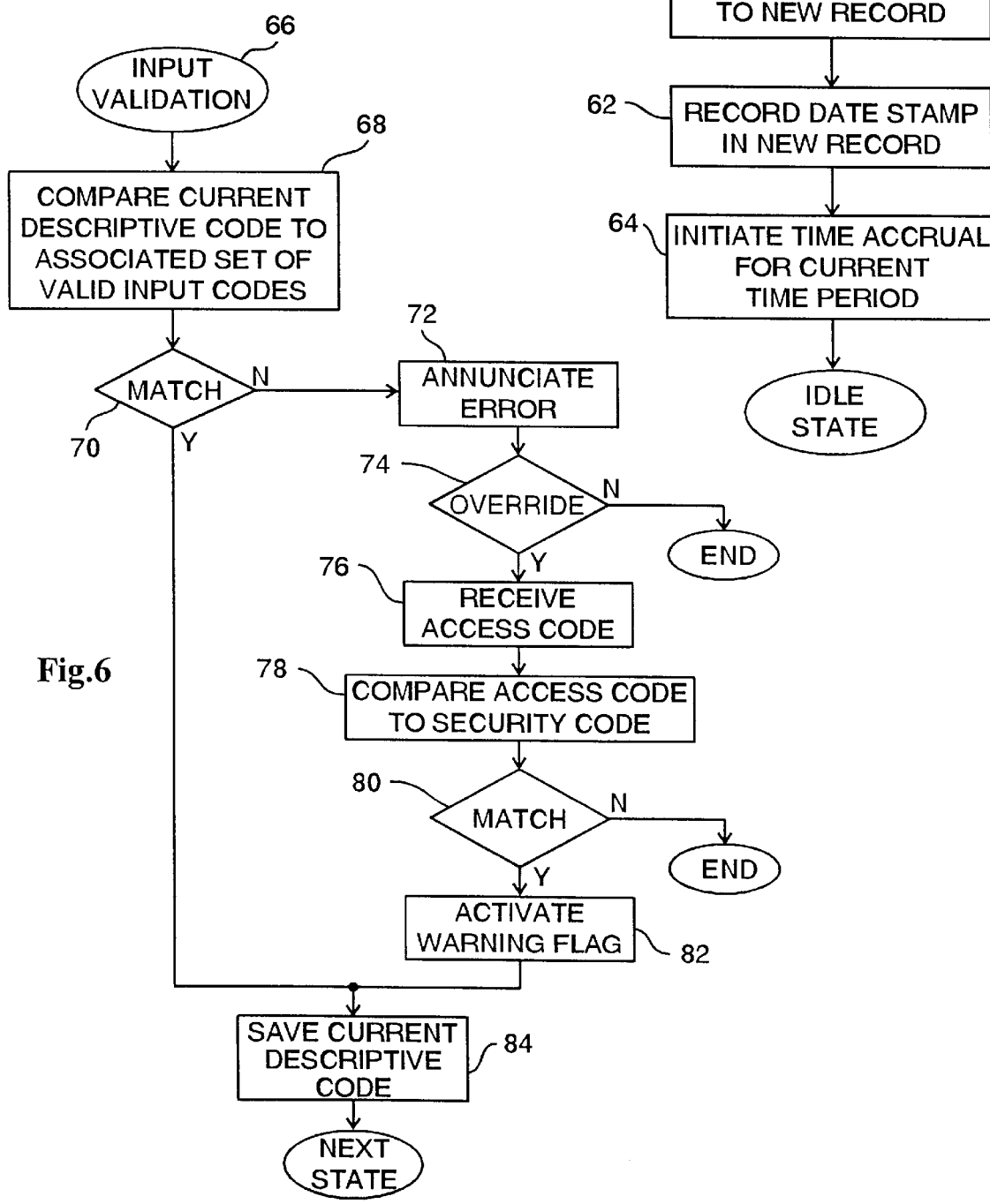
FIG. 6 is an input validation process performed by the data collection device.

FIG. 6 is a flow diagram of an input validation process 66 performed by device 10. Process 66 is preferably performed while device 10 is in any one of update states 48a–d. As described above in connection with time accrual process 56, any one of the descriptive codes may be subjected to input validation at the time of entry.

Input validation process 66 begins with a task 68, which compares the descriptive code entered by the user to one or more valid input codes stored in memory 14 (see FIG. 2). Preferably, the data field 41 being validated (see FIG. 3) has an associated set of valid input codes. For example, a particular device 10 may be programmed, via downloaded data, such that only a few identification numbers are deemed acceptable for the user of device 10. The valid input codes are utilized to screen data at the time it is input into device 10 rather than subsequently during data compilation and processing. This feature is desirable to increase the reliability and integrity of the recorded data, which may be corrected immediately by the user if not initially validated. In addition, any erroneous data may be correctly reentered while the relevant information is fresh in the user's memory.

After task 68, a query task 70 determines whether the current descriptive code matches one of the valid input codes associated with the particular data field 41. If query task 70 determines that there is a match, then a task 84 is initiated. Task 84 is described in detail below. If, however, query task 70 determines that the current descriptive code differs from each of the valid input codes, then a task 72 is prompted.

Task 72 annunciates that the current descriptive code is erroneous. Task 72 may generate an error message at display element 20, or cause device 10 to emit a warning tone. Next, a query task 74 detects whether the user wishes to override the input screening feature of device 10. Query task 74 may be responsive to a user input, such as the engagement of SEC button 30 (see FIG. 1). If query task 74 does not detect an override request, then input validation process 66 ends. If process 66 exits at query task 74, device 10 may subsequently prompt the user to reenter a different descriptive code, or it may enter idle state 46 (see FIG. 4) and continue accruing time for the current work assignment.

If query task 74 determines that the user wishes to override the validation feature, then a task 76 receives an access code or password from the user. The access code or password may be any alphanumeric sequence formatted according to individual operating specifications. Following task 76, a task 78 compares the access code to a security code stored in memory 14. Next, a query task 80 tests whether the access code matches the security code. If the access code does not match the security code, then input validation process 66 ends. If process 66 exits at query task 80, device 10 may prompt the user to input another security code or another descriptive code, or it may enter idle state 46. If query task 80 determines that the access code matches the security code, then a task 82 is performed.

Task 82 activates a warning flag bit 44 (see FIG. 3) associated with the current descriptive code to indicate the overridden status of the current descriptive code. In other words, task 82 indicates that the current descriptive code is not one of the valid input codes. As described above, in the preferred embodiment each descriptive code has a warning flag bit 44 associated with it. The warning flag may be useful during subsequent processing and/or analysis by the central compiler. In particular, a reviewer will be alerted to pay special attention to flagged data. In addition, a wide variety of unusual situations are accommodated by allowing a user to enter an invalid code. For example, a user may need to input a new charge number that has not yet been entered into the central compiler or added to the present list of valid input codes. Following task 82, task 84 saves the current descriptive code in default buffer 42. As described above, task 84 is also performed when the current descriptive code matches one of the valid input codes.

After task 84, input validation process 66 ends and device 10 preferably transitions into a new operating state. For example, another descriptive code may be entered in one of update states 36a–d, or the current contents of default buffer 42 may be stored in new record 38a during data entry state 50.

With reference to FIG. 7, an edit process 86 is illustrated as a flow diagram. Process 86 is performed by device 10 in response to a user request to alter existing data stored in memory 14. Although process 86 may be utilized to alter the descriptive codes in existing records 38, the preferred embodiment prevents writable access to time duration data 43 and date stamps 45 (see FIG. 3). Thus, device 10 allows the user to correct mischaracterized descriptions of work assignments while preventing the user from manipulating the amount of time recorded for the work assignments.

Edit process 86 begins with a task 88, which gets the selected descriptive code for editing. Device 10 may be configured to perform task 88 according to individual applications. For example, task 88 may be prompted by an activation of BROWSE button 26 in connection with one of data field buttons 36 (see FIG. 1). As shown in FIG. 4, the user may engage BROWSE button 26 to place device 10 into browse state 52. As described above, the user may engage SCROLL UP and SCROLL DOWN buttons 28 and 30 to view records 38. In the preferred embodiment, the user may place device 10 into edit state 54 by engaging SEC button 32 to select the descriptive code that he or she wishes to edit as indicated by the data field 41 (see FIG. 3) currently being viewed. After task 88 obtains the next descriptive code for editing, a task 90 is performed.

Task 90 receives an access code or password from the user of device 10. Following task 90, a task 92 compares the access code to a security code stored in memory 14. Next, a query task 94 tests whether the access code matches the security code. Tasks 90, 92, and 94 are analogous to tasks 76, 78, and 80 of input validation process 66. As such, the above description of tasks 76, 78, and 80 should be referred to. If the access code matches the security code, then a task 96 is performed.

Task 96 permits writable access to database 40. As described above, database 40 contains the various records 38 that characterize the different work assignments. Task 96 enables the user to alter the descriptive codes in database 40. After task 96, a task 98 allows the user to edit the current descriptive code according to a user input. Although records 38 may be altered, the contents of default buffer 42 preferably remain unchanged. After task 98, a task 100 activates warning flag bit 44 (see FIG. 3) associated with the current (edited) descriptive code. As described above, the warning flag preferably indicates the edited status of the current descriptive code such that the particular record 38 may be scrutinized at the system level by a reviewer of the time-tracking data. After task 100, a task 102 stores the edited descriptive code into the associated record 38.

After task 102 stores the edited descriptive code, a task 104 is preferably performed. Task 104 terminates writable access to database 40 such that only one descriptive code may be edited at a time. This feature prevents device 10 from remaining "unsecured" after the user edits one descriptive code. In addition, task 104 reduces the likelihood of tampering with accurate records stored in the database. Data alteration is difficult due to the rigid security procedures of edit process 86, and a person is less likely to accidentally or illegitimately manipulate previously recorded data. Following task 104, edit process 86 ends. Device 10 may thereafter return to browse state 52 or idle state 46.

Referring to FIG. 8, a comment process 106 is depicted as a flow diagram. Process 106 is performed during a comment mode of operation in response to a user request. For example, the comment mode may be defined as a particular task or function associated with data field 41c (see FIG. 3). Process 106 is preferably performed when edit process 86 is inadequate to correct mistaken or forgotten entries. For example, the user may realize that he or she failed to enter a work assignment or failed to log out on time. In either example, device 10 may be switched to the comment mode to enable the user to input a short explanatory message that can be subsequently processed at the central compiler.

Comment process 106 preferably utilizes data fields 41a–d to store a user-input message in memory 14. As described above, each data field 41 is capable of storing up to 32 characters. As such, process 106 begins with a task 108, which gets the next data field 40 for message entry. Task 108 may be performed when any data field button 36 is engaged. After task 108, a task 110 writes the user-supplied message into the current data field 41. Rather than entering a descriptive code, the user enters a comment in the current data field 41. To distinguish between descriptive codes and comment messages, device 10 may detect the entry of a specific prefix associated with comment messages. Alternatively, user interface 22 may include a comment button (not shown) for use with process 106 or device 10 may simply consider the message entry to be a descriptive code.

After task 110 writes the message into the current data field 41, a task 112 is prompted. Task 112 activates a warning flag associated with the message input. The warning flag may be employed to indicate that the current data field 41 contains a comment message rather than a descriptive code. Following task 112, a query task 114 determines whether the message is to continue into another data field 41. If the message is longer than one data field 41, i.e., longer than 32 characters in the preferred embodiment, then query task 114 leads to a query task 116.

Query task 116 tests whether more data fields 41 are available to the user. If the message is too long and query task 116 determines that no additional data fields 41 remain, then comment process 106 ends. If process 106 exits at this point, then device 10 may prompt the user to reenter a shorter message, it may annunciate an error, or it may save as much of the message as possible. If task 116 determines that more data fields 41 remain, then process 106 is reentered at task 108. Thus, process 106 is substantially repeated until the entire message is entered or until query task 116 determines that the message length exceeds the storage space available in data fields 41a–d.

If query task 114 determines that the message is complete, then a task 118 stores the message as a record 38 in database 40. Thus, one or more data fields 41 may be utilized by the user to explain errors, mistakes, or add forgotten work assignments as necessary. Although not shown in FIG. 8, nothing prevents comment process 106 from incorporating the security code feature described above in connection with input validation process 66 and edit process 86.

In summary, the present invention provides an improved data collection device for associating time with work assignments at the time when and at the place where work is performed. The data collection device is capable of validating the input data at the time of entry, which improves the quality of the collected data. The data collection device is relatively easy to operate, and the manner in which data may be entered is not overly restricted. In addition, the data collection device may be utilized to record data over extended periods of time in excess of 24 hours.

The above description is of a preferred embodiment of the present invention, and the invention is not limited to the specific embodiment described and illustrated. For example, the functional button designations and the names of the various descriptive data fields are used herein for illustrative purposes only. In addition, some of the various process tasks need not be performed in the precise order described, and the processes themselves may or may not be independently performed. Furthermore, many variations and modifications will be evident to those skilled in this art, and such variations and modifications are intended to be included within the spirit and scope of the invention, as expressed in the following claims.

What is claimed is:

1. A method of operating a remote hand-held data collection device to associate time with accounts at the instant when and the place where work is performed, said method comprising the steps of:

obtaining, through a user interface portion of said hand-held data collection device, N descriptive codes that identify a first work assignment, wherein N is an integer greater than one;

initiating, in a time monitor portion of said hand-held data collection device, accrual of time for a first time period during which said first work assignment is performed, said initiating step being performed in response to said obtaining step;

acquiring, through said user interface, M updated descriptive codes that identify a second work assignment, wherein M is an integer greater than zero and less than N; and beginning, in said time monitor, accrual of time for a second time period during which said second work assignment is performed, said beginning step being performed in response to said acquiring step.

2. A method according to claim 1, further comprising the step of recording a date stamp in a memory portion of said hand-held data collection device, said date stamp corresponding to said first and second time periods.

3. A method according to claim 1, further comprising the steps of:

switching to a comment mode in response to a user input at said user interface; and writing a user-entered message received at said user interface into a database located in a memory portion of said data collection device, said writing step occurring after said switching step.

4. A method according to claim 3, further comprising the step of activating a warning flag associated with said message in said memory, said activating step being performed in response to said switching step.

5. A method according to claim 1, further comprising the step of comparing, in a processor portion of said hand-held data collection device, one of said N descriptive codes to one or more valid input codes stored in a memory portion of said data collection device, wherein said initiating step is performed when said one descriptive code matches one of said valid input codes.

6. A method according to claim 1, wherein said N descriptive codes and said M updated descriptive codes are stored in a database located in a memory portion of said data collection device, and wherein said method further comprises the steps of:

receiving an access code, through said user interface of said data collection device;

comparing, in a processor portion of said hand-held data collection device, said access code to a security code stored in said memory portion of said data collection device; and permitting writable access to said database when said access code matches said security code.

7. A method according to claim 6, wherein said database located in said memory includes time duration data associated with the time accrued during each of said first and second time periods, and said method further comprises the step of preventing writable access to said time duration data.

8. A method according to claim 6, further comprising the step of editing one of said N descriptive codes and M updated descriptive codes, said editing step occurring after said permitting step.

9. A method according to claim 8, further comprising the step of terminating writable access to said database, said terminating step being performed after said editing step.

10. A method according to claim 8, further comprising the step of activating a warning flag associated with said one descriptive code stored in said database located in said memory to indicate status of said one descriptive code.

11. A method of operating a remote hand-held data collection device to associate time with accounts at the instant when and the place where work is performed, said method comprising the steps of:

obtaining, through a user interface portion of said hand-held data collection device, a plurality of descriptive codes that identify a work assignment;

comparing, in a processor portion of said hand-held data collection device, one of said obtained descriptive codes to one or more valid input codes stored in a memory portion of said data collection device; and initiating, in a time monitor portion of said hand-held data collection device, accrual of time for a time period during which said work assignment is performed, said initiating step being performed in response to said comparing step.

12. A method according to claim 11, wherein said initiating step is performed when said one descriptive code matches one of said valid input codes.

13. A method according to claim 11, further comprising the steps of:

receiving, through said user interface, an access code when said one descriptive code differs from each of said valid input codes; and comparing, in said processor, said access code to a security code stored in said memory of said data collection device; wherein said initiating step is performed when said access code matches said security code.

14. A method according to claim 13 wherein said one descriptive code is stored in said memory and said method further comprises the step of activating a warning flag associated in said memory with said one descriptive code to indicate status of said one descriptive code, said activating step occurring when said access code matches said security code.

15. A method according to claim 11, wherein N represents the number of said descriptive codes from said obtaining step, said descriptive codes are stored in said memory, and wherein said method further comprises the steps of:

acquiring, through said user interface, M updated descriptive codes such that a second work assignment is described, wherein M is an integer greater than zero and less than N; and beginning, in said time monitor, accrual of time for a second time period during which said second work assignment is performed, said beginning step being performed in response to said acquiring step.

16. A method according to claim 11, wherein said obtained descriptive codes are stored in a database located in a memory portion of said data collection device, and wherein said method further comprises the steps of:
- receiving an access code through said user interface of said data collection device;
- comparing said access code to a security code stored in said memory portion of said data collection device; and
- permitting editing of said descriptive codes when said access code matches said security code.

17. A method according to claim 11, further comprising the step of recording a date stamp corresponding to said time period in said memory.

18. A method of operating a remote hand-held data collection device to associate time with accounts at the instant when and the place where work is performed, said method comprising the steps of:
- obtaining, through a user interface portion of said hand-held data collection device, a plurality of descriptive codes that identify a work assignment;
- storing said descriptive codes in a memory portion of said hand-held data collection device so that each of said descriptive codes has a warning flag indicator associated therewith;
- initiating, in a time monitor portion of said hand-held data collection device, accrual of time for a time period during which said work assignment is performed, said initiating step occurring in response to said obtaining step; and
- selectively activating said warning flag indicators in response to a user input received through said user interface.

19. A method according to claim 18, wherein:
- said method further comprises the step of editing one or more of said descriptive codes in said memory in accordance with user input received through said user interface; and
- said selectively activating step activates said warning flags associated with said edited descriptive codes.

20. A method according to claim 18, wherein:
- said method further comprises the step of comparing, in a processor portion of said hand-held data collection device, one of said obtained descriptive codes to one or more valid input codes stored in said memory portion of said data collection device; and
- said selectively activating step activates said warning flag associated with said one descriptive code when said one descriptive code differs from each of said valid input codes.

21. A remote hand-held data collection device for associating time with accounts at the instant when and the place where work is performed, said data collection device comprising:
- a user interface configured to supply a plurality of descriptive codes that describe a work assignment;
- a memory configured to store one or more valid input codes;
- a processor, coupled to said user interface and said memory, said processor being configured to compare one of said descriptive codes to said one or more valid input codes; and
- a time monitor coupled to said processor, said time monitor being configured to accrue time for a time period during which said work assignment is performed; wherein
- said time monitor is configured to accrue time for said time period when said one descriptive code matches one of said valid input codes.

22. A data collection device according to claim 21, wherein:
- said descriptive codes are stored in said memory;
- N represents the number of said descriptive codes that describe said work assignment;
- said memory is configured to update M of said descriptive codes such that a second work assignment is described;
- M is an integer greater than zero and less than N; and
- said time monitor is configured to accrue time for a second time period during which said second work assignment is performed.

23. A data collection device according to claim 21, wherein:
- said user interface is configured to supply an access code; and
- said processor is configured to compare said access code to a security code stored in said memory such that editing of said descriptive codes is permitted when said access code matches said security code.

24. A data collection device according to claim 21, further comprising means for recording a date stamp corresponding to said time period.

* * * * *